United States Patent [19]
Ralph

[11] Patent Number: 5,325,943
[45] Date of Patent: Jul. 5, 1994

[54] VARIABLE ORIFICE OIL/GASS DAMPER FOR AIRCRAFT LANDING GEAR

[75] Inventor: Harry C. Ralph, Kirkland, Wash.

[73] Assignee: The Boeing Company, Seattle, Wash.

[21] Appl. No.: 899,942

[22] Filed: Jun. 17, 1992

Related U.S. Application Data

[63] Continuation of Ser. No. 589,659, Sep. 28, 1990, abandoned.

[51] Int. Cl.⁵ .................................................. F16F 9/48
[52] U.S. Cl. ................................ 188/288; 188/322.19; 188/316
[58] Field of Search ............... 188/279, 281, 284, 288, 188/312, 313, 322.19, 322.22, 269, 316; 267/64.26

[56] References Cited

U.S. PATENT DOCUMENTS

| | | | |
|---|---|---|---|
| 1,584,884 | 5/1926 | Merrick | 188/288 |
| 1,893,187 | 1/1933 | Urbanek et al. | 188/288 |
| 3,110,367 | 11/1963 | Roberts | 188/288 |
| 3,944,198 | 3/1976 | Sakamoto | 267/64.26 |
| 3,985,190 | 10/1976 | Kammerer et al. | 188/288 |
| 4,048,405 | 9/1977 | Souslin | 188/284 |
| 4,797,971 | 1/1989 | Eger et al. | 188/288 |
| 4,814,770 | 4/1989 | Hahn | 188/284 |
| 5,041,966 | 5/1991 | Wang | 267/64.26 |

FOREIGN PATENT DOCUMENTS

| | | | |
|---|---|---|---|
| 1201895 | 9/1965 | Fed. Rep. of Germany | 188/288 |
| 525468 | 3/1922 | France | 188/288 |
| 7603075 | 9/1977 | Netherlands | 188/312 |

Primary Examiner—Robert J. Oberleitner
Assistant Examiner—Lee W. Young
Attorney, Agent, or Firm—Jones, Tullar & Cooper

[57] ABSTRACT

A variable orifice damper includes a sealed cylinder, a piston rod mounted for sliding movement along the axis of the cylinder carrying a piston head and a tail rod, the piston rod and tail rod extending from the interior of the cylinder outward beyond a corresponding support surface on the cylinder wall. The cylinder contains a cavity portion whose internal size varies along the cylinder axis located axially between two adjacent cavity portions of larger size than the intermediate cavity portion. The piston head has a surface whose cross sectional area varies along the axis of the cylinder and is adapted to pass through the cavity portion of variable size, the piston head and cavity portion defining a orifice of variable size therebetween. The piston rod has a bore containing a separator piston actuated by fluid passing the orifice and adapted to compress gas held in the bore.

6 Claims, 2 Drawing Sheets

VARIABLE ORIFICE OIL/GASS DAMPER FOR AIRCRAFT LANDING GEAR

This is a continuation of copending application Ser. No. 07/589,659 filed on Sep. 28, 1990 and now abandoned.

BACKGROUND OF THE INVENTION

1. Field of the Invention

This invention relates to the field of damping devices for use in aircraft landing gear, particularly to dampers in which flow of viscous hydraulic or oleic fluid through an orifice of variable size dissipates impact energy associated with landing an aircraft.

2. Description of the Prior Art

Conventional dampers operate by throttling viscous fluid through orifices, usually formed through a piston separating a high pressure chamber from a low pressure chamber in a sealed cylinder in which the piston moves in response to relative movement of components of a landing gear to which the piston and cylinder are attached. Operation of the damper is enhanced if the areas of the orifices are changed while energy is dissipated.

Various means are employed to alter the size of the orifices, often in accordance with changes in pressure of the viscous fluid within the cylinder chambers. U.S. Pat. No. 4,428,567 describes a shock absorber in which two oil reservoirs, separated by a piston, communicate through a bore that is open permanently and through ports controlled by reed valves that open and close in response to the magnitude of differential pressure across the piston.

The magnitude of forces produced by springs actuated by relative displacement of a piston and a cylinder containing the piston are often used to open and close piston orifices. For example, in the shock absorber described in U.S. Pat. No. 3,365,101, a spring-biased valve plate closes control ports in a piston until a magnitude of pressure developed by the stroke of the piston becomes sufficient to open the control ports. In the hydropneumatic motor of U.S. Pat. No. 3,079,897, the size of a spring-loaded valve having a variable cross section in a piston head is responsive to flow resulting from relative motion between a cylinder and piston to vary the area of the valve opening and maintain constant the rate of flow. U.S. Pat. No. 3,865,356 describes an automotive shock absorber, in which piston throttling orifices are closed by a spring-loaded valve and are opened to permit fluid flow when an axial force reached a specified magnitude.

A shock absorber for an aircraft landing gear is described in U.S. Pat. No. 4,381,857 wherein impact energy is dissipated by viscous flow through several orifices and rebound energy is dissipated through a greater number of orifices, each orifice maintaining its original size.

However, the size of damper orifices can be made to vary in accordance with the position of the piston during the stroke of the damper. An example of this technique is described in U.S. Pat. No. 4,082,255. There the effective size of a orifice defined by an annular space between an aperture of fixed size in an orifice fitting supported on an orifice tube and a metering rod of variable diameter, changes as the rod passes through the fitting during the damper stroke. The outer diameter of the metering rod is shaped as required to produce the requisite variable area between the fitting and the rod.

Metering rod dampers have theoretically high operating efficiency due to their ability to vary the rate of fluid flow across the orifice formed between the metering rod and the aperture in the orifice fitting. However, such dampers present many disadvantages. Generally, the metering rod, orifice support tube and attachment fittings add weight to the damper. Functionally, the outer cylinder, piston rod, metering rod and orifice support tube are susceptible to bending deflections due to landing forces induced by side loads and drag loads applied to the end of the piston rod. This bending reduces substantially the service life of the parts affected by it. Bending deflection of the metering rod and orifice support tube causes eccentric movement of the rod in the orifice and effects contact between the rod and one side only of the orifice. The localized nature of the contact induces excessive wear of the orifice aperture, which adversely influences damping characteristics.

Fixed orifice dampers operate inherently at lower efficiency than variable orifice dampers. Bending developed as a result of drag and side landing loads is reacted between a bearing supporting the piston rod at the end of the cylinder and a piston head bearing located between the periphery of the piston and the inner surface of the cylinder. Axial distance between these reaction forces is small, particularly when the piston is fully extended from the cylinder end; therefore, the magnitude of reaction forces is high, and bearing pressures and wear are excessive.

SUMMARY OF THE INVENTION

Various difficulties inherent in conventional variable area orifice dampers are resolved with the damper according to the present invention.

The damper of the present invention achieves variable orifice size; consequently theoretically high operating efficiencies are readily achievable by judicious sizing an orifice represented by the annular space between the outer surface of a piston head and the inner surface of a cylinder. This spacing defines the size of the orifice and its size varies along the axis of the cylinder and piston rod as the relative location of the piston head changes relative to the cylinder during the damper stroke.

The variable orifice damper of the present invention includes a sealed cylinder, a piston rod mounted for sliding movement along the axis of the cylinder carrying a piston head and a tail rod, the piston rod and tail rod extending from the interior of the cylinder outward beyond a corresponding support surface on the cylinder wall. The cylinder contains a cavity whose internal size varies along the cylinder axis and is located axially between two adjacent cavities of larger size than the intermediate cavity. The piston head has a surface whose cross sectional area varies along the axis of the cylinder and is adapted to pass through the cavity of variable size, the piston head and cavity defining an orifice of variable size therebetween. The piston rod has a bore containing a separator piston actuated by fluid passing the orifice and adapted to compress gas held in the bore.

The damper is substantially unaffected by bending distortion, yet the variable space, gap or clearance changes in accordance with the relative positions of the piston head and cylinder in which the piston moves during the damper stroke. The damper provides a variable orifice between the piston head and cylinder, through which a viscous fluid is forced by piston displacement. A second cylinder containing a gas compressed by fluid after passing through the variable orifice provides a second stage of viscous damping.

Bending carried by the piston rod and tail rod is transferred to the cylinder by reaction forces located at the axial ends of the cylinder. Because these reaction forces are widely spaced throughout the full range of damper travel, loads induced by bending are relatively small. Furthermore, the effect of bending tending to distort the walls of the cylinder and the piston head is minor because the size of the cylinder and piston rod is large and therefore transmits bending loads in larger, stiffer and stronger members than is possible in conventional variable orifice dampers. Accordingly, bending has substantially little effect on size, shape and location of the orifice.

BRIEF DESCRIPTION OF THE DRAWING

The invention is described in more detail with reference to the embodiments illustrated in the following drawings.

DESCRIPTION OF THE PREFERRED EMBODIMENT

Figure 1:
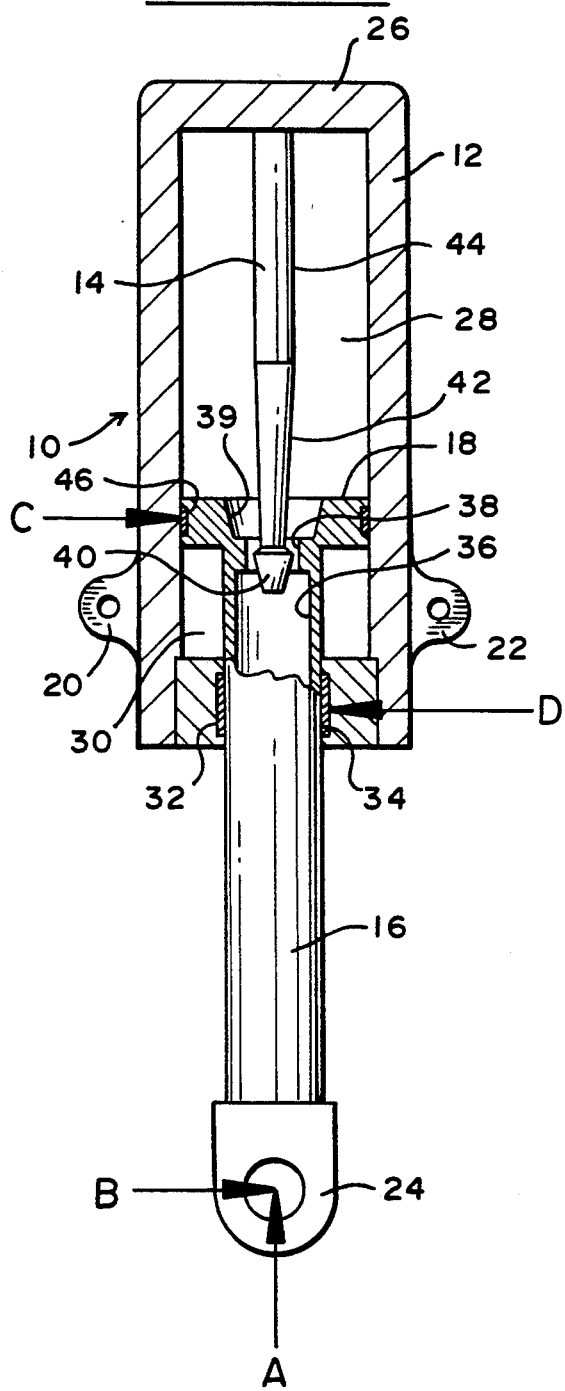
FIG. 1 is a cross section along the axis of a variable orifice damper in the prior art.

Referring first to FIG. 1, a damper 10, known in the prior art, for use with an aircraft landing gear includes a hydraulic cylinder 12, a metering rod 14, a piston rod 16, and a piston head 18 carried on the piston rod. Generally, the cylinder is fixed by attachment lugs 20, 22 suitable for connection to the aircraft structure, and the piston rod carries an attachment fitting 24, by which a clevis connection is made to a member of the landing gear that is displaceable axially due to forces developed during impact of the landing gear with the ground. In addition to the axially directed force A, transversely directed forces B, due to aerodynamic drag and side loads, are applied to the piston rod fitting 24.

The metering rod 14 is suspended from the upper end 26 of the cylinder, which defines a first space 28 in the region bounded by the inner surface of the cylinder end and the upper surface of the piston head. A second space 30 is bounded by the lower surface of the piston head, the inner surface of the cylinder and a lower seal 32, which supports the piston rod for sliding movement within the cylinder on a hardened bearing surface 34 and hydraulically seals the cylinder.

The piston rod 16 has an axial bore 36 extending along its length, an orifice 38 of relatively small cross sectional area located at the end of the bore, and a conical surface 39 located above the orifice and formed in the piston head.

The metering rod 14 mounted coaxially with the piston rod bore 36, has a headed end 40, a conical surface 42 whose cross sectional area increases as the distance from the head increases, and a constant diameter cylindrical surface 44 located at the end of the conical surface. Viscous fluid contained in space 28 is throttled between the orifice 38 and the surfaces of the metering rod into the piston rod bore 36 as the piston rod slides within the cylinder due to landing forces applied to the fitting. The size of the clearance between the metering rod 14 and orifice 38 varies as the relative positions of the piston head and metering rod change during the stroke of the damper. Throttling fluid through this variable clearance causes damping, the dissipation of energy associated with landing loads, to be controlled accordingly.

The side loads B induce bending in the piston rod and cylinder, which is ultimately reacted at the lugs 20, 22. The bending moment carried by the piston rod 16 is transferred to the cylinder 12 by reaction forces C and D. Because these reaction forces are closely spaced, particularly when the piston rod extends its full length from the cylinder, the reaction forces are large and hardened bearings 34, 46 are required to prevent excessive wear on the cylinder. Furthermore, bending distorts the piston orifice, piston rod, cylinder and metering rod, thereby adversely affecting the otherwise predictable clearance between the orifice and the metering rod during the damper stroke.

Figure 2:
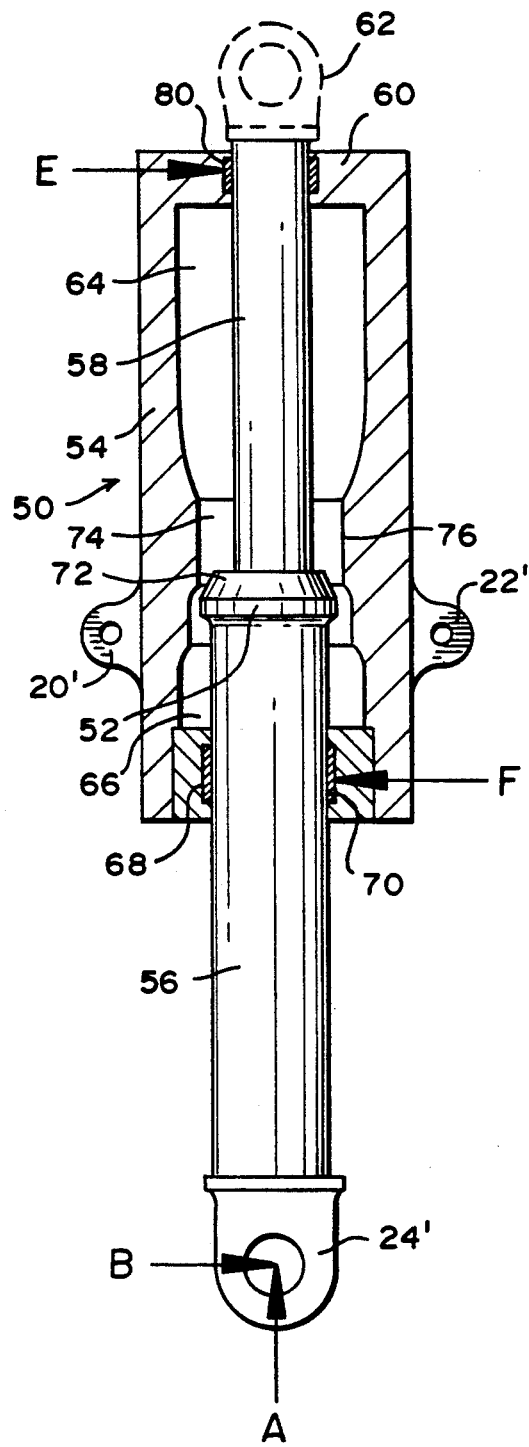
FIG. 2 is a cross section along the axis of a metering orifice damper according to this invention adapted for use with an aircraft landing gear.

FIG. 2 shows a damper 50 according to the present invention in which a variable clearance between a piston head 52 and cylinder 54 is substantially unaffected by bending distortion, yet the variable clearance changes in accordance with the relative positions of the piston head and the cylinder in which the piston moves during the damper stroke.

The damper includes the hydraulic cylinder 54, and a piston rod 56 carrying the piston head 52 and a tail rod 58. The cylinder is fixed by attachment lugs 20', 22' to the aircraft structure, and the piston rod end carries an attachment fitting 24', by which a connection is made to an axially displaceable member of the landing gear. The tail rod is connected to, or formed integrally with the piston rod and piston head, and extends from the interior of the cylinder through its upper end wall 60. The end of the tail rod may carry a fitting 62 suited for attachment to an axially displaceable member of the landing gear. Generally only one fitting 24' or 62 is used. If a connection to the landing gear is made at fitting 24' then the damper is of the "pusher" type because the vertical landing loads, applied at the lower end of the piston rod, push the piston head through the cylinder. If a connection to the landing gear is made at fitting 62, then the damper is of the "puller" type because the vertical landing loads, applied at the upper end of the tail pull the piston head through the cylinder.

The cylinder contains a first cavity portion 64 in the region bounded by the inner surface of the cylinder end 60 and the upper surface of the piston head. A second cavity portion 66 is bounded by the lower surface of the piston head, the inner surface of the cylinder and a lower seal 68, which supports the piston rod for sliding movement within the cylinder on a hardened bearing surface 70 and seals the cylinder.

The piston head defines an external surface whose size and cross sectional area change along the axis of the piston rod and cylinder. The cylinder contains a third cavity portion 74 located between the first cavity portion 64 and the second cavity portion 66 having a cross sectional area smaller than the cross sectional area of the first cavity portion adjacent the third cavity portion and the cross sectional area of the second cavity portion adjacent the third cavity portion. The piston head 72 is adapted to pass through the third cavity portion with a predetermined gap therebetween, the size of the gap changing as the position of the piston head changes relative to the position of the third cavity portion.

The size of the orifice, defined by the space between the piston head and the walls of the third cavity portion, changes as the position of the piston head changes relative to the position of the third cavity portion.

Viscous fluid contained in cavity 64 is throttled through orifice 76 into cavity 66 as the piston slides within the cylinder due to forces applied to the attachment fitting on landing. The size of the clearance between the surface of the third cavity portion and the piston head varies as the relative positions of the piston head and cylinder change during the stroke of the damper.

Figure 3:
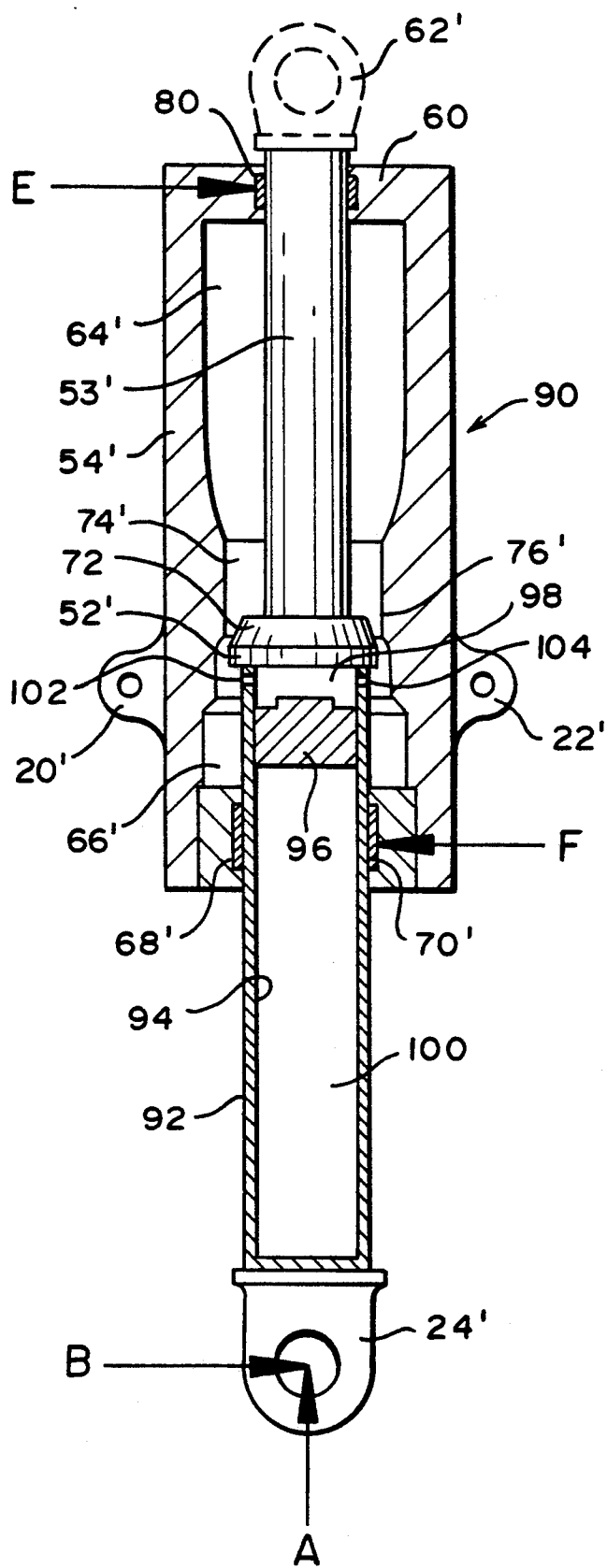
FIG. 3 is a cross section along the axis of a two stage, variable metering orifice landing gear damper according to this invention.

FIG. 3 shows another form of a variable damper according to this invention in which the damper provides a variable orifice between a piston head and cylinder, through which a viscous fluid is forced by piston displacement, and a second cylinder containing a compressible medium, such as gas, compressed by a separator piston and actuated by fluid after passing through the variable orifice.

The damper 90 includes a hydraulic cylinder 54', a piston rod 92 carrying a piston head 52' and tail rod 58'. The cylinder is fixed by attachment lugs 20', 22' to the aircraft structure. The piston rod carries an attachment fitting 24' or the tail rod carries fitting 62', by which a connection is made by either fitting to an axially displaceable member of the landing gear. The tail rod is connected to, or formed integrally with the piston rod and piston head and extends from the interior of the cylinder through its upper end wall.

The cylinder contains a first cavity portion 64' bounded by the inner surface of cylinder end 60 and the upper surface of the piston head. A second cavity portion 66' is bounded by the lower surface of the piston head, the inner surface of the cylinder and a lower seal 68', which supports the piston rod on bearing surface 78' and seals the cylinder.

The piston head defines an external surface whose size and cross sectional area change along the axis of the piston rod and cylinder. The cylinder contains a third cavity portion 74' located between the first cavity portion 64' and second cavity portion 66' having a cross sectional area smaller than the cross Sectional area of the first cavity portion at the third cavity portion and the cross sectional area of the second cavity portion at the third cavity portion. The piston head passes through the third cavity portion with a predetermined gap therebetween, the size of the gap changing as the position of the piston head changes relative to the position of the third cavity portion.

The size of orifice 76', defined by the space between the piston head and the walls of the third cavity portion, changes as the position of the piston head changes relative to the position of the third cavity portion. Viscous fluid contained in cavity 64' is throttled through the orifice into cavity portion 66' as the piston slides within the cylinder.

The piston rod has an axial bore 94 containing a second or separator piston 96 moveable in the bore and dividing the bore into a high pressure chamber 98 and a low pressure chamber 100. Chamber 98 communicates with the interior of cylinder 54' through radial passages 102, 104, by which viscous fluid enters chamber 98 after passing from cavity portion 64' through orifice 76'. This action forces separator piston 96 downward in the piston rod bore, compresses gas in that bore and provides a second stage of damping in addition to the first stage associated with forcing viscous fluid through orifice 76'.

In the damper of FIGS. 2 and 3, bending carried by the piston rod and tail rod is transferred to the cylinder by reaction forces E and F located at the axial ends of the cylinder. Because these reaction forces are widely spaced throughout the full range of damper travel, loads induced by bending are relatively small. Furthermore, the effect of bending tending to distort the walls of the cylinder and the piston head is minor because the size of the cylinder and piston rod is large and therefore transmits bending loads in larger, stiffer and stronger members than is possible in conventional variable orifice dampers. Bending produces substantially little effect on size, shape and location of the orifice.

I claim:

1. A variable orifice damper for dissipating energy in an aircraft landing gear, comprising:

a hollow cylinder having an elongated wall defining a longitudinal axis, said elongated wall being closed at each longitudinal end, the cylinder containing a first cavity portion, a second cavity portion, and a third cavity portion located between the first cavity portion and the second cavity portion along the longitudinal axis of the cylinder between the longitudinal ends, the cross sectional area of the first and second cavity portions being constant and the cross sectional area of the third cavity portion changing along the longitudinal axis of the cylinder, such that at each end of the third cavity portion the cross sectional area of the third cavity portion equals that of the adjacent first and second cavity portion respectively, and between each end of the third cavity portion the cross sectional area of the third cavity portion is reduced along the longitudinal axis of the cylinder; and a piston rod defining a longitudinal axis and mounted coaxially with the cylinder for sliding movement in the cylinder relative to the cavity portions, said piston rod having a first portion supported laterally by, and extending through one of said closed longitudinal ends of the cylinder, a second portion supported laterally by, and extending through the other of said closed longitudinal ends of the cylinder, and a piston head located between the first portion and the second portion, the cross sectional area of the piston head changing along the longitudinal axis of the piston rod, the piston head being adapted to pass through the cavity portions with a predetermined space therebetween, the size of the space changing as the position of the piston head changes relative to its position in the third cavity portion such that it is greater adjacent the first and second cavity portions than along the third cavity portion.

2. The damper of claim 1 further comprising a first bearing located between the first portion of the piston rod and one of said closed longitudinal ends of said cylinder and the second bearing located between the second portion of the piston rod and the other of said closed longitudinal ends of said cylinder.

3. The damper of claim 1 wherein the piston rod includes attachment means for making a connection to the piston rod, said attachment means being located on the first portion of the piston rod.

4. The damper of claim 1 wherein the piston rod includes attachment means for making a connection to the piston rod, said attachment means being located on the second portion of the piston rod.

5. The damper of claim 1, further comprising: mounting means secured to said elongated wall.

6. A variable orifice damper for dissipating energy in an aircraft landing gear, comprising:
- a hollow cylinder having an elongated wall defining a longitudinal axis, said elongated wall being closed at each longitudinal end, the cylinder containing a cavity portion having an axially variable cross sectional area between the longitudinal ends;
- a piston rod defining a longitudinal axis and mounted for sliding movement in the cylinder, said piston rod being supported laterally by and extending through one of said closed longitudinal ends of the cylinder, said piston rod having an axial bore sealed against passage of fluid, a separator portion located within the bore for sliding movement therein dividing the bore into first and second members, and at least one passage communicating the first chamber to the interior of the cylinder;
- a portion head carried by the piston rod, adapted to pass through the cavity portion with a predetermined space therebetween, the size of the space between the cavity portion and the piston head changing as the position of the piston head changes relative to the position of the cavity portion; and
- a tail rod connected to the piston rod, said tail rod being supported laterally by and extending through the other of said closed longitudinal ends of the cylinder, wherein the cavity portion of said hollow cylinder contains a first cavity portion, a second cavity portion, and a third cavity portion located between the first cavity portion and the second cavity portion along the longitudinal axis of the cylinder, the cross sectional area of the first and second cavity portions being constant and the cross sectional area of the third cavity portion changing along the longitudinal axis of the cylinder, such that at each end of the third cavity portion the cross sectional area of the third cavity portion equals that of the adjacent first and second cavity portion respectively, and between each end of the third cavity portion the cross sectional area of the third cavity portion is reduced along the longitudinal axis of the cylinder, and wherein the size of the predetermined space changing such that it is greater adjacent the first and second cavity portions.

* * * * *